R. S. GEHR.
PLANTER.
APPLICATION FILED NOV. 9, 1918.

1,400,739.

Patented Dec. 20, 1921.
3 SHEETS—SHEET 1.

Inventor
Ray S. Gehr

UNITED STATES PATENT OFFICE.

RAY S. GEHR, OF CLEVELAND, OHIO.

PLANTER.

1,400,739.          Specification of Letters Patent.          Patented Dec. 20, 1921.

Application filed November 9, 1918. Serial No. 261,794.

*To all whom it may concern:*

Be it known that I, RAY STEWART GEHR, a citizen of the United States, residing at Cleveland, county of Cuyahoga, State of Ohio, have invented certain new and useful Improvements in Planters, of which the following is a specification, reference being had therein to the accompanying drawings.

The invention relates to methods of and machines for planting corn and especially to mechanism adapted to plant the seeds in such a manner as to increase the yield per acre and reduce the cost, especially the labor cost, of producing corn.

It is well understood that in hill planting as now practised the individual plants, by reason of the close bunching of the seeds in the hill, have unfavorable conditions for growth both in the ground and above it. My invention contemplates hill planting in which the kernels of each hill are deposited in a definite spaced relation to each other, and one object of the invention is the provision of a practical and efficient mechanism for separating the individual seeds from the mass in a container and delivering them at the separated points of discharge. Another object of the invention is the provision of improved dropping valve mechanism adapted for use in spaced kernel check row planting.

My invention also contemplates a more effective method of drilling, namely, drilling in, what I term, double rows. In these "double" rows the seeds are deposited along two parallel lines spaced from each other far enough, say five to seven inches, so that the plants of one line will not interfere with the development of those of the other line, while, at the same time, the two lines of plants can be cultivated, and otherwise treated, as one row. Accordingly, one of the objects of my invention is the provision of a machine for drilling the seeds in such "double" rows. Another object of the invention is the provision of a machine adapted to perform the above described spaced kernel hill planting and having means by which it can readily be converted or adapted for "double" row drilling.

A further object of the invention is the provision in a machine such as has been referred to of improved means for covering the seeds.

Other objects of my invention, relating more especially to various structural improvements, will appear in the following detailed description setting forth, in connection with the accompanying drawings, various embodiments of my improvements.

In the drawings,

Fig. 15 is a view similar to Fig. 14 but with the distributer advanced to show the next, following seed duct thereof.

Fig. 17 is an enlarged fragmentary vertical radial section through the distributer lock device.

Figure 1:
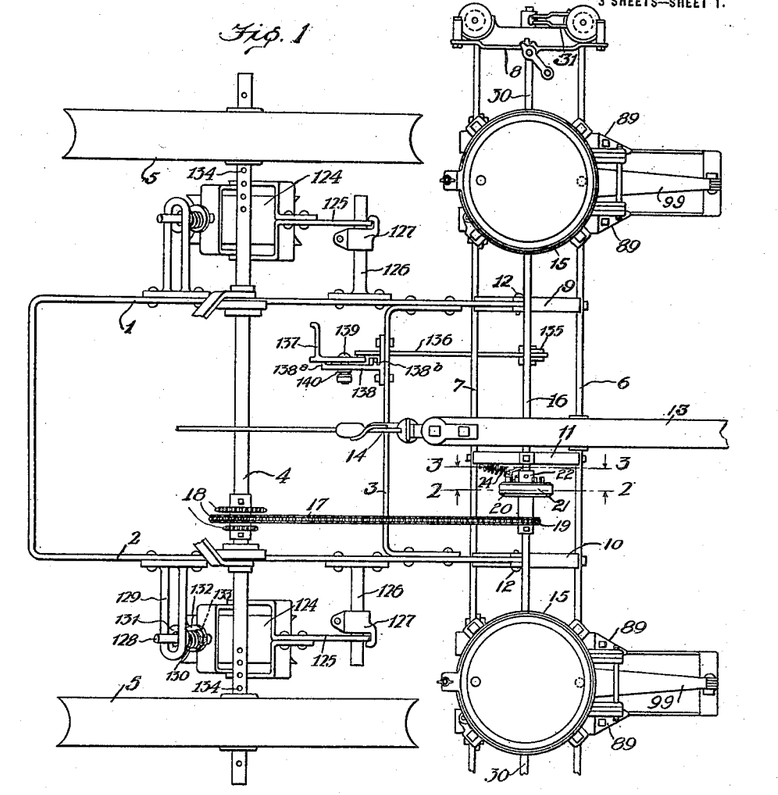
Figure 1 is a plan view of a planter embodying some of my improvements, parts of the machine being omitted or broken away to permit illustration as clear and on as large a scale as possible.

Referring, at the outset, more especially to Fig. 1, the machine has a main frame comprising side bars 1 and 2, which are united by a cross bar 3, and this frame is mounted upon an axle 4 having ground wheels 5, 5.

At the front of the main frame is disposed a transverse frame consisting of main bars 6 and 7 which are connected at their outside ends by check head castings 8, 8, the check head devices being broken away at the right side of the machine as shown in Fig. 1. The bars 6 and 7 are also rigidly connected by cross braces 9, 10 and 11. The front frame is pivotally connected to the front ends of the side bars 1 and 2 of the main frame by pins 12, 12, which pass through the front ends of the bars 1 and 2 and lugs or ears formed on the frame braces 9 and 10.

13 is a tongue suitably connected to the front frame. The front frame and the main frame are suitably connected by locking lever devices, designated as an entirety by 14, which are adapted to raise and lower the front frame so that the runners or other furrow opening devices carried thereby can be lifted free of the ground, or so that the furrow opening devices can be forced into the ground and there secured in operative position. It will be understood that a driver's seat is suitably supported on the main frame. The seat and lever mechanism, as well as other parts of a complete planter, are not shown in detail, or are wholly omitted for the reason that as to these features, any preferred forms of the well known constructions may be employed.

On the front frame of the machine are mounted seed containers or hoppers and separating mechanisms 15, 15, which will presently be described in detail. 16 is a seeder operating shaft mounted in suitable bearings carried by the front frame; preferably one of the bearings is carried by the frame brace 11 while others, not shown, are carried by the hopper structures. The seeder operating shaft 16 is designed to be connected at its respective ends by suitable gearing to the rotary seed plates of the seed separating mechanism. The seeder shaft is driven from the axle 4 by a chain 17 which passes over any one of a series of various sized sprocket wheels 18 carried by said axle and over a sprocket wheel 19 which is rigidly connected to one element of a clutch mechanism 20. This clutch 20 is of the type having a continuously driven member which turns freely on the seeder shaft, a second member fast on the seeder shaft, and means controlled by check fork devices for intermittently connecting and disconnecting the two said members to cause an intermittent rotation of the seeder shaft. As shown, the clutch comprises a continuously rotating part 21 which turns freely on the seeder shaft and carries the sprocket wheel 19, and an intermittently moving part 22 which is fast on the seeder shaft. The part 22 carries a pawl 23 which tends normally to engage the internal teeth 21$^a$ of the part 21 by reason of the action of the coil spring 24 which is connected at one end to the pawl 23 and at its other end to the clutch part 22. The pawl 23 carries on one side a dog 23$^a$ which projects laterally through an aperture in the clutch part 22. 25 is a lever pivoted to the inner side of the clutch part 22 diametrically opposite the pawl 23 and similar to said pawl except that it is shorter and does not engage with the clutch teeth 21$^a$. The lever 25 carries a dog 25$^a$ which projects through a second aperture in the clutch part 22, and the pawl 23 and lever 25 are connected by link 26 which causes the parts 23 and 25 to move in unison. The clutch part 22 carries on its outer side laterally extending cam plates 27 and 28 which are disposed adjacent the dogs 23$^a$ and 25$^a$, respectively.

The clutch pawl is normally prevented from engaging the continuously rotating part 21 by an arm 29 which is mounted upon a rocker shaft 30 which carries at its extreme ends check forks 31. The arm 29 is loose on the shaft 30, being secured between the brace casting 11 and a downwardly extending arm 32 which is fast on the shaft 30. The arm 32 has an upward extending lug 32$^a$ arranged to engage a laterally extending lug 29$^a$ carried by the arm 29 to swing said arm rearward when one of the check forks is engaged by a tappet on the check wire. The arm 29 has a downward extension 29$^b$, and this extension and the lower end of the arm 32 are connected by means of a plate 33 to the front end of a coil spring 34, the rear end of which is secured to a lug 35 on the frame brace 11. At its upper end the arm 29 carries a laterally extending roller 29$^c$ which is designed to engage the clutch cams 27, 28, and the dogs 23$^a$, 25$^a$.

Figure 2:
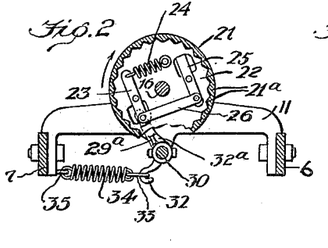
Fig. 2 is a vertical section taken on the line 2—2 of Fig. 1.
Figure 3:
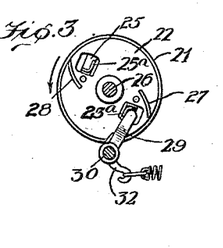
Fig. 3 is a vertical section on an enlarged scale taken on the line 3—3 of Fig. 1.
Figure 4:
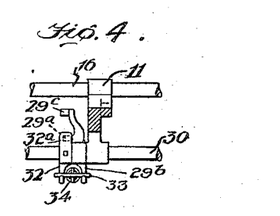
Fig. 4 is a detail view showing in front elevation the clutch control arm and some of the parts associated with it.

The spring 34 serves to normally hold the check forks on the shaft 30, and also the clutch arm 29, in their forward positions, the roller 29$^c$ being then in the path of the clutch cams and dogs so that one of the dogs is engaged by the roller 29$^c$ and the pawl 23 is held out of engagement with the continuously rotating clutch part 21. When one of the check forks is engaged by a tappet on the check wire, the lug 32$^a$ is moved rearward and carries the arm 29 rearward out of the path of the clutch cams and dogs. The pawl 23 of the clutch is then free to be swung by the spring 24 into engagement with the continuously rotating clutch part 21 and, by reason of this clutch engagement, the seeder shaft 16 is caused to move with the clutch part 21. Immediately upon the release of the check fork from the wire tappet, the spring 34 swings the arms 29 and 32 forward again to their normal positions indicated in Figs. 2 and 3; and thereupon, as the clutch member 22 rotates, the next, approaching cam engages the roller 29° of the clutch arm, forces it rearward and then permits it to be snapped quickly forward by the spring 34 against the adjacent clutch dog, causing a disengagement of the pawl 23. Thus, if the parts were in the positions indicated in Fig. 3 when the tappet engaged the check fork, the rearward movement of the arm 29 would permit the engagement of the clutch and the parts would turn in the direction of the arrow (Figs. 2 and 3); then the arm 29 having returned to its normal position, the cam 28 would engage the roller 29ᵃ as described and cause the latter to strike the dog 25ᵃ to cause the release of the clutch pawl and the stopping of the seeder shaft 16. As the cam 27 and the dog 23ᵃ are diametrically opposite the cam 28 and dog 25ᵃ, each actuation of the check fork and corresponding engagement of the clutch causes a half revolution of the seeder shaft.

Referring now to the seed separating devices it will be observed that the planter shown is of the two-row type, and inasmuch as the two seed separating and depositing mechanisms are, in essential respects, duplicates of each other, a description of one will suffice. The seed hopper and the separating devices at the bottom thereof are supported on an annular base plate 36. On the inner part of this base plate is rotatably supported an annular bevel gear 37 which meshes with and is driven by a bevel pinion 38 on the seeder shaft 16. The bevel gear is secured in operative position by plates 39 which are bolted to the web 40 on the base plate 36. Above the base plate 36 and spaced therefrom is an annular plate 41. This annular plate or ring is supported from the base plate by an upstanding lug 42 formed on the rear side of the base plate and by bracket arms 43 which extend from the front side of the base plate and carry a pivot pin 44 which extends through bracket arms 45 on the plate 41. On the plate 41 is mounted an annular seed plate 46. This plate is provided with a lug or tooth 47 adapted to be engaged by a lug 48 extending upward from the gear 37 (see Figs. 13 and 17) so that the seed plate will be turned by the gear. The seed plate is of the edge drop type having seed cells 49 separated by upstanding teeth 50.

Figure 19:
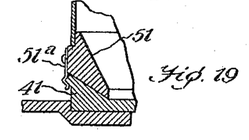
Fig. 19 is an enlarged fragmentary vertical section on the line 19—19, Fig. 5.
Figure 20:
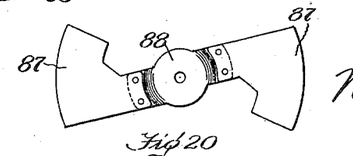
Fig. 20 is a plan view of the upper dropping valve structure.

The hopper bottom comprises an outer ring part 51, and a crowned central part 52 which is separated at its edges from the ring part 51 by an annular space which registers with the circular series of seed cells 49 and teeth 50. The hopper bottom is cast integrally, the two parts 51 and 52 being united by yoke or bridge parts 53. The ring 51 is formed at its front side with bracket arms 54 which are mounted on the pivot 44, while at its rear side it is formed with a lug or bracket 55 which is slotted to receive a swinging bolt 56 carried by the lug 42 on the base plate 36 and having a winged nut 57 by which the hopper bottom and the plate 41 can be clamped down in operative position. At the same time, by disengaging the bolt 56 the hopper bottom and annular plate 41 may be swung upward on the pivot pin 44; or the hopper bottom may be thus swung upward without disturbing the plate 41 so that the seed plate 46 is exposed and may be removed for the substitution of another if it be desired. The ring 41 and part 51 of the hopper bottom are preferably disengageably connected at their rear sides by a spring clip 51ᵃ, as shown in Fig. 19.

In my pending application, Serial No. 575,156, filed August 2, 1910, I present a machine designed to carry out spaced kernel hill planting and double row drilling; and in the machine shown in the said application the seed container is provided with four discharge openings for the seeds and there are four separate ducts to conduct the seeds downward to the ground. Since a certain minimum circumferential space is necessarily occupied by the cut-off devices at each discharge opening, it is difficult, where four openings are provided, to secure sufficient circumferential space for the filling of the seed cells of the seed plate without undesirably enlarging the diameter of the seed container and the seed plate. In my pending application referred to I have sought to overcome this difficulty as far as possible by providing a special form of cut-off and knock-out device which is exceedingly compact circumferentially. In the present construction, however, the difficulty referred to is overcome by providing a smaller number of discharge openings for the seed container, preferably two, and, in connection with the discharge openings, means for distributing the individual seeds discharged first to one and then to another of a plurality of ducts which conduct the seeds downward to the ground.

In the present form of construction, the seed hopper is provided with two discharge openings 58 which are formed in the plate 41 and disposed diametrically opposite each other directly beneath cut-off and knock-out devices 59. These latter devices may be of any of the well known forms of construction that are suitable, but I prefer to use a construction of the character shown in my copending application because of its circumferential compactness.

The pitch distance of the cells of the seed ring is a factor of the distance between the discharge openings and, therefore, as the seed ring is turned, two seed cells pass simultaneously under the two knock-out devices and there is a corresponding simultaneous discharge of two seeds. The ratio of the pinion 38 and the gear 37 is one to three, and the seed ring is provided with twelve cells. Therefore, when the clutch mechanism 20 is actuated to cause a half rotation of the seeder shaft, two seeds are discharged through each of the two discharge openings of the hopper, or four in all.

The base plate 36 rests directly upon two seed duct castings which, as entireties, are designated by the numerals 60, 61. These two castings are rigidly secured to the main bars 6 and 7 of the front frame of the machine. Each casting is formed with a vertical seed tube or conduit 62 and an inclined seed tube 63, the two conduits having their upper ends closely adjacent while their lower ends are spaced apart, as is clearly indicated in Fig. 6. The casting 60 has its vertical seed tube arranged behind the inclined one, while the casting 61 has its vertical tube arranged in front of its inclined tube. Each of the castings has a bracket arm 64 extending from its inclined tube 63 and this bracket arm is formed with lugs 65 arranged to be secured by bolts 66 to the frame bar 6, in the case of casting 60 and to the frame bar 7 in the case of frame casting 61, while the vertical seed tube is formed with lugs 67 adapted to be secured by bolts 68 to the rear bar 7 in the case of the casting 60 and to the front bar 6 in the case of the casting 62. The frame bars 6 and 7 are formed with a transversely extending series of bolt holes so that the seed tube castings can be adjusted inward and outward. The castings 60 and 61 are formed at their upper ends with lugs 69, 70, and the base plate 36 has lugs 71 resting upon lugs 69, 70 and secured thereto by bolts 72.

Figure 13:
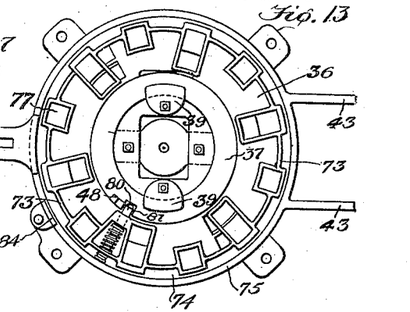
Fig. 13 is a plan view of the distributer, the associated driving gear and the hopper base on which these parts are supported.
Figure 14:
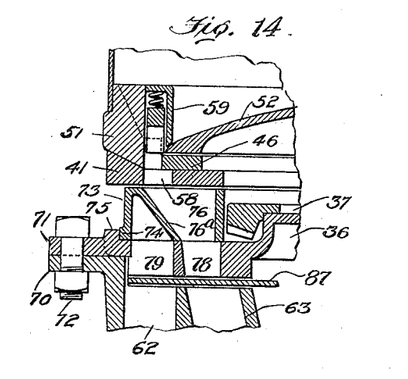
Fig. 14 is an enlarged fragmentary section taken on a vertical radial plane through one of the hopper discharge apertures.
Figure 16:
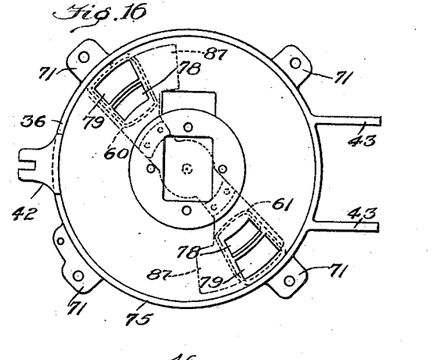
Fig. 16 is a plan view of the hopper base casting upon which the distributer rests, the location of the upper ends of the seed tubes or conduits and of the upper dropping valves being indicated by dotted lines.

The two seed tubes of each of the castings 60, 61, are designed to receive seeds from one of the discharge apertures of the seed hopper, and to cause the delivery of the individual seeds into first one tube and then the other of each of the pairs of seed tubes, I provide a distributing device 73 which is interposed between the annular plate 41 of the hopper mechanism and the base plate 36, being supported by the latter. This distributer (see Figs. 13, 14 and 15) is in the form of an annular casting which has an outer rim part 74 that rests upon the base plate 36 and fits within an upstanding circular flange 75 formed on said base plate, and this rim part carries a circular series of ducts 76, 77. Each of the distributer ducts 76 has one of its side walls 76ª inclined as shown in Figs. 13 and 14, while each of the ducts 77 has its side walls approximately vertical, as shown in Figs. 13 and 15. The construction and arrangement is such that the upper ends of all of the ducts are brought successively into register with the two hopper discharge apertures 58 when the distributer is rotated, while the lower ends of the distributer ducts 76 are at the same time brought into register with apertures 78 in the base plate 36 which register with the inclined seed conduits 63 and the lower ends of the distributer ducts 77 are brought into register with apertures 79 in the base plate 36 which register with the upper ends of the vertical seed conduits 62 (see Figs. 14 and 15). The distributer, which is turned in unison with the seed plate, has the same number of ducts as there are cells in the seed plate and the seed plate cells and distributer ducts are arranged in vertical alinement. Hence, as the seed plate and distributer are turned, the latter will cause the individual seeds to be delivered alternately to the inclined seed conduits 63 and the vertical conduits 62, or rather to swinging valve plates which control the entrances to said conduits, and which will presently be described.

Figure 18:
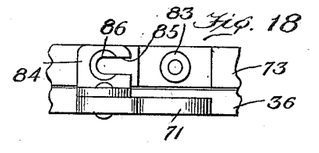
Fig. 18 is an enlarged fragmentary view showing the distributer lock device in elevation.

To effect the turning of the distributer in unison with the seed plate, it is disengageably locked to the bevel gear 37 by means of a bolt 80 which is carried by the distributer and engages a socket 81 in the gear 37 (see Figs. 13, 17 and 18). The locking bolt is provided with a coil spring 82 which abuts at its inner end against a shoulder on the bolt and at its other end against the outer rim part of the distributer. On the outer end of the bolt is a knob 83 which can readily be grasped to draw the bolt outward against the tension of the spring 82 and disengage it from the gear 37. To secure the bolt in withdrawn position and, at the same time, lock the distributer against movement, I mount on an extension of the base plate an upstanding bracket 84 which is formed with a horizontal slot 85 to receive the stem of the locking bolt, and in the outer face of the bracket 84 I form a circular socket 86 adapted to receive the knob 83 of the bolt. When the bolt has thus been withdrawn and engaged with the bracket 84, the gear 37 is free to turn in relation to the distributer and the latter is locked in position with its vertical ducts 77 in register with the discharge apertures 58 of the hopper. With the distributer thus positioned and held, it will be seen that all of the seeds discharged from the hopper will be delivered to the vertical seed conduits 62, this being desirable when the machine is to be used for drilling in double rows. When the machine is to be used for hill dropping, the distributer is thrown into operation by causing the bolt 80 to engage the gear 37.

The entrance of seeds into the upper ends of the seed tubes or conduits 62 and 63 is controlled by swinging valve plates 87, 87 which are mounted on a carrier 88. This carrier is pivotally mounted on a depending U-shaped bracket 89 which is bolted at its upper ends to the web 40 of the base plate 36. The carrier 88 is formed with bevel gear teeth 88$^a$ which mesh with the teeth of a bevel gear segment 90 fast on the rocker shaft 30. Thus when the rocker shaft is actuated by the engagement of one of the check forks with a tappet on the check wire, valve plates 87 are swung from beneath the passages 78, 79 to permit the entrance of seeds into the conduits 62 and 63, respectively.

The seed conduits 62 and 63 are enlarged at their lower ends to form valve casings 91, and these casing parts are joined by flat plate-like parts 92. To the lower ends of the castings 60 and 61 are secured furrow opening runners 93, 93. Each of these runners comprises frame castings 94, 95, and wrought side plates 96, 97, which are riveted to the castings 94 and 95, the two plates being united at their front ends to form an upturned blade 98, and these blade parts are at their upper ends bent laterally and bolted to the front end of a brace 99 which, in turn, has its rear end bolted to the front frame bar 6. On referring to Fig. 7 it will be observed that the castings 60, 61, extend downward between the runner plates 96 and 97, and are shaped to receive the frame castings 94 and 95 of the runners. Bolts 100 and 101 serve to draw the castings 94 and 95 into tight interlocking engagement with the seed tube castings and constitute a secure but readily detachable fastening for the runners.

Figures 5, 6, 7, 8, 9, 10, 11:
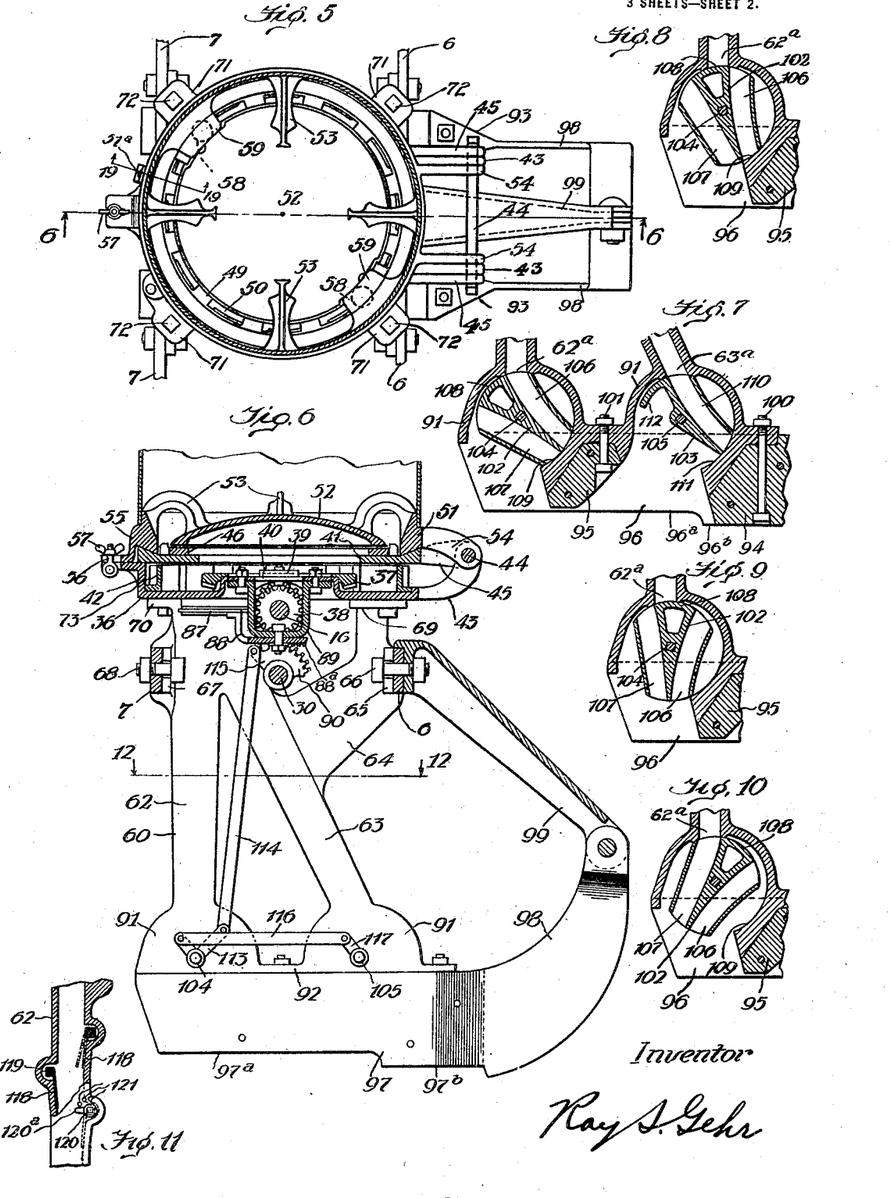
Fig. 5 is a plan view on an enlarged scale of one of the seed hoppers and associated parts of the machine, the top of the hopper being broken away to show the inner construction.
Fig. 6 is a vertical section taken on the line 6—6 of Fig. 5.
Fig. 7 is a vertical section taken on the line 7—7 of Fig. 12.
Figs. 8, 9 and 10 are fragmentary vertical sections showing one of the dropping valves in various positions which it occupies in operation.
Fig. 11 is a fragmentary view of one of the seed tubes.

It will be noted, on reference to Figs. 6 and 7, that the side plates 96 and 97 of the runners are recessed at their lower sides from a point directly beneath the front dropping valve to their rear ends, thus forming horizontal bottom edges 96$^a$, 97$^a$ materially above the horizontal bottom edges 96$^b$, 97$^b$ at the front end of the runner. The purpose of this construction will later be explained.

At the lower end of each of the two vertical seed tubes 62 is an oscillating cylindrical valve 102 and at the lower end of each of the seed tubes 63 is a somewhat similar valve 103. These valves are mounted on pins 104 and 105 which extend through the valve casings 91 of the castings 60 and 61, having suitable bearing supports in said casings. Each of the valves 102 has seed passages 106 and 107 which are separated at their upper ends by a cylindrical wall 108 which, like the passages 106 and 107, is designed to coöperate with the port 62$^a$ at the lower end of the seed tube 62. At their lower ends the passages 106 and 107 are closely adjacent each other and are designed to coöperate with the seat or ledge 109.

Each of the valves 103 has a seed passage 110 designed to coöperate at its upper end with the port 63$^a$ at the lower end of the seed tube 63 and at its lower end with a seat or ledge 111. It is also provided at its upper end with a cylindrical wall 112 which coöperates with the port at the lower end of the seed tube 63.

For the operation of the valves each pin 104 is provided with a bell crank 113 which has one arm connected by a link 114 to a crank arm 115 fast on rocker shaft 30. The other end of the bell crank 113 is connected by a link 116 to a crank 117 carried by the pin 105. By means of these connections the rocking of the check fork shaft 30 is transmitted to pins 104 and 105 and the dropping valves mounted thereon. In Fig. 7 the valves are shown in their normal, closed position, while Figs. 8, 9 and 10 show one of the valves 102 in various other operative positions, and it will be understood that the valves 103 simultaneously occupy similar positions.

Figure 12:
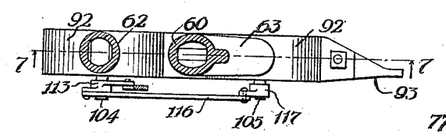
Fig. 12 is a horizontal section taken on the line 12—12 of Fig. 6.

In connection with one of the vertical seed conduits of each pair of furrow opening runners, and preferably in the forward vertical conduit, I provide means for more or less retarding the passage of seeds therethrough for the purpose of varying the spacing of the seeds in one furrow of the row with respect to the seeds in the other furrow thereof. In the construction shown in Figs. 11 and 12 this means consists of a series of deflector or baffle plates 118, 118 each of which is mounted on a pivot pin 119. At one end each pivot pin carries a knob 120 formed with a finger 120$^a$ which is adapted to engage any one of a series of notches formed in the side wall of the conduit 62. At its other end the pivot pin carries a nut 122, and interposed between said nut and the adjacent wall of the conduit 62 is a coil spring 123. The pin 119 is angular in cross section as indicated and cannot turn in relation to its plate 118 but is free to move endwise in relation to it; and hence by grasping the knob 120, the pin can be drawn endwise against the tension of the spring far enough to release the finger 120$^a$ and permit the angular adjustment of the pin and deflector plate.

When check-rowing the baffle plates are adjusted to inoperative position as shown in Fig. 11, but when drilling one or more of said baffle plates can be swung more or less into the seed passage to correspondingly retard the passage of seeds and thus vary the spacing of the seeds in one furrow with respect to those in the other furrow.

As the seeds are deposited both in hill planting and drilling in parallel adjacent furrows special means must be provided for covering the seeds. In the construction shown I provide the ground wheels 5, 5 with concave rims and set these wheels in line with the outer runners of the respective seed separating and dropping mechanism, and thus provide for the covering of the seeds in the outside furrow of each row. To cover the seeds deposited in the inside furrow, I provide at each side of the machine a relatively small covering wheel 124 which is suitably mounted in the lower end of a forked drag bar 125 which has its upper end pivotally mounted on a bracket rod 126 carried by the adjacent side bar of the main frame of the machine, the upper end of the drag bar being secured in position by a clip 127 which is adjustable laterally inward and outward. The axle of each covering wheel 124 carries a forked thrust rod 128 which extends upward and rearward through a slotted bracket 129 which is bolted to the adjacent side bar of the main frame. Each thrust rod carries a coiled spring 130 which is interposed between washers 131, 132, the upper washer 131 abutting against the underside of the bracket 129 while the lower washer rests upon a nut 133 threaded upon the thrust rod to form adjustable abutments for the lower end of the spring.

It will be understood that each of the hopper and runner mechanisms is adjustable inward and outward on the front frame of the machine to vary the distance between the rows, such adjustment being permitted by the provision of a series of bolt holes in the frame bars 6 and 7 in the usual manner. To accomodate such adjustment the main axle 4 is provided at each end with a series of bolt holes 134 so that the covering wheels 5, 5, whose hubs are secured in position by the usual bolt fasteners, can be adjusted inward and outward. Similarly, adjustment of the small covering wheels 124, 124 is readily effected by adjusting the clips 127 inward or outward. The pressure of the small covering wheels upon the ground can readily be varied by adjusting the nuts 133 to increase or decrease the tension of the springs 130. This spring adjustment makes it possible to equalize the ground pressure of the main wheels 5, 5 and the small wheels 124, 124.

For controlling the clutch 20 and actuating the dropping valves independently of the check wire, I provide mechanism operable by the foot of the driver. 135 is a lever arm on the rocker shaft 30 and having its outer end connected by a link 136 to the lower end of a foot lever 137 which is mounted on a bracket 138 carried by the main frame bar 3. The lever 137 is loosely supported on a pivot bolt 139 and a spring 140 is interposed between the bracket 138 and the nut of the bolt 139 so that the foot lever can be rocked laterally somewhat if the tension of the spring is overcome. The bracket 138 is formed with stop lugs 138ª and 138ᵇ with which the foot lever coöperates.

When the foot lever is used for hill dropping, it swings between the two stop lugs 138ª and 138ᵇ; and when it is desired to use the machine for drilling, the distributer 73 having been disengaged from the gear 37 and locked against movement as above described, the foot lever is thrust forward and pressed laterally to enable it to pass the front stop 138ᵇ which secures it in its forward position. This movement of the foot lever moves the top valves 87 to inoperative position and throws the dropping valves 102 into the position indicated in Fig. 10 so that they provide a free passage for the seeds through the seed ducts 62 to the ground and, at the same time, the clutch controlling arm 29 is moved to and secured in its rear, inoperative position so that the seeder shaft 16 is continuously rotated.

In the operation of the above described machine when used for hill planting, the active check fork, on engaging a check wire tappet as the machine moves forward across the field, is swung backward and the clutch mechanism 20 is thrown into operation, thus causing a half revolution of the seeder shaft 16. This half revolution of the seeder shaft causes two cells of the seed plate in each hopper to pass over each of the two discharge apertures of the hopper so that four seeds are discharged, the two seeds which are first discharged from the two hopper apertures passing into two of the inclined distributer ducts 76, let us say, while the next two seeds simultaneously discharged from the hopper pass into two of the vertical ducts 77 of the distributer. The seeds thus delivered into the distributer ducts are received upon the valve plates 87 and, on the next actuation of the check fork, are delivered by said valves into the conduits 62, 63 corresponding to the four ducts, 76, 77. Thus, the four seeds find their way separately through the four seed tubes to the dropping valves 102 and 103. If the valves have returned to their normal position shown in Fig. 7, the seeds are received directly into the passages 106 and 110 and lodged on the ledges 109, 111; but if the valves should not have returned to the positions shown in Fig. 7, the seeds may be received upon the walls 108 and 112 of the valves where they are temporarily held until brushed off into the passages 106, 110, as the valves move to their normal position shown in Fig. 7. Ordinarily the dropping valves will have returned to their fully closed position by the time the seeds reach the valves. But if, for any reason, the return movement of the valves should be delayed it is impossible for the seeds to pass through the valves to the ground because the ports 62ª, 63ª, are always closed when the lower ends of the valve passages 106 and 110 are open to the ground. The seeds having passed into the valves and lodged as above described, will, on the next actuation of the check fork, be discharged on the ground in the desired spaced relation as the valves move to the open position shown in Fig. 9, another lot of four seeds being meanwhile delivered by the top valves 87 into conduits 62, 63 while a third lot of four seeds is separated from the mass in the hopper and delivered through the distributer upon the top valves 87. Thus, the cycle of operations is repeated indefinitely as the machine advances. It will be observed that the oscillating dropping valves are so arranged that the four seeds of a hill are deposited in the ground approximately at the four corners of a square. It will also be observed that the ledges 109, 111 from which the seeds are discahrged upon the ground, are inclined downwardly and rearwardly and that the opening movement of the valves positively ejects the seeds in a corresponding downward and rearward direction with a velocity proportional to the rate of travel of the machine so that the forward movement of the planter is offset and the seeds deposited at the predetermined position for the hill regardless of the rate at which the planter moves.

As has been explained the seed plates of the runners are recessed or cut away at their lower sides from points beneath the front dropping valve to their rear ends. The object of this is to prevent the inner side walls of the runners interfering with the seeds dropped by the front valves. Prior to my adoption of this expedient I found it difficult to secure an accurate positioning of the seeds and discovered that the seeds dropped by the front valves were not infrequently dragged forward by engagement with the side walls of the advancing runner. By the use of the cut away form of construction the lower edges of the side walls of the runner below the front valves and at all points to the rear thereof are maintained well above the bottom of the furrow and interference with the seeds is consequently obviated. At the same time the side walls of the runner extend somewhat into the furrow and prevent the top soil falling into the furrow until the seeds have been deposited therein.

When the machine is to be used for double row drilling, the distributer 73 is disengaged from the gear 37 and locked in position with vertical ducts in alinement with the two hopper discharge apertures and the vertical seed conduits 62. The foot lever 137 is then thrust to its extreme forward position and secured in front of the bracket lug 138b, thus throwing the clutch 20 into continuous engagement and securing the dropping valves 102 in the position indicated in Fig. 10. Thereupon as the machine advances, the seeds discharged from one aperture of the hopper pass into one of the vertical conduits 62 and thence into the valve passage 107 to the ground, while all of the seeds discharged from the other aperture of the hopper are delivered into the other vertical seed conduit 62 and pass similarly to the ground in the other furrow; thus, the seeds are drilled in the two parallel furrows so as to form what I call a "double" row.

As the seed plate 46 is removable, others having different numbers of seed cells may be substituted for it for the purpose of varying the spacing of the drilled seeds in each furrow of a row, and further variation may be produced by moving the chain 17 from one to another of the sprocket wheels 18. In addition, the spacing of the seeds in one furrow of a row in relation to those of the other furrow, can be varied by adjusting the deflector plates 118 in one of the conduits 62, in a manner previously explained.

Whether hill planting or drilling, the seeds deposited in the two parallel furrows of each row are covered by the wheels 5 and 6 as will readily be understood.

Where the soil is fairly uniform in quality I consider it preferable to plant four kernels to the hill, whether the soil be poor or good, and then adjust the number of seeds per acre to the quality of the soil by varying the distance between rows. With spaced kernel planting it is possible to do this because with the spacing of the kernels in the hill, normal development, both in the soil and above it, is insured for all four kernels, whereas, with bunched kernel hill planting it is impossible to plant four kernels to the hill without having in numerous instances one plant surrounded and stunted by the other three.

It is, therefore, possible with spaced kernel hill planting to correspondingly reduce the number of rows and thus materially reduce the labor involved both in planting and cultivating. A reduction of the number of rows also has the advantage of opening the corn plants more to the action of the sun.

In the case of drilling, also, it is possible by my improved method of drilling in double rows to increase the number of seeds to the row, with spacing of seeds no closer than in single rows with a less number of seeds, and thereby reduce the number of rows and reduce the labor involved in planting and cultivating.

It will be understood that my various improvements can be embodied in various forms of construction other than those which have been illustrated for the purpose of explanation and that my invention is not limited to the forms of construction disclosed except as specified in the following claims.

What I claim is:

1. In a seed planter, the combination of a seed container having a discharge opening, mechanism for separating individual seeds from the mass in the container and delivering them singly into the discharge opening, a plurality of conduits adapted to receive seeds discharged from the container and deposit them on the ground in spaced relation to each other, and means for causing the discharged seeds to be distributed to the conduits in alternation.

2. In a seed planter, the combination of a seed container having a plurality of discharge openings, mechanism for separating individual seeds from the mass in the container and delivering them singly into said discharge openings, a plurality of conduits associated with each discharge opening and adapted to receive seeds therefrom and deposit them on the ground in spaced relation to each other, and means for causing the seeds discharged from each of the said openings to be distributed to the conduits associated therewith in alternation.

3. In a seed planter, the combination of a seed container having a plurality of discharge openings, mechanism for separating individual seeds from the mass in the container and delivering them singly into said discharge openings, a plurality of conduits associated with each discharge opening and adapted to receive seeds therefrom and deposit them on the ground in spaced relation to each other, and a seed distributing device common to all the discharge openings and adapted to distribute the seeds discharged from each opening to the conduits associated therewith in alternation.

4. In a seed planter, the combination of a seed container having a discharge opening, mechanism for separating individual seeds from the mass in the container comprising a rotatable seed plate having a circular series of seed cells which pass in succession over the discharge opening when the seed plate is rotated, a plurality of conduits adapted to receive seeds discharged from the container and deposit them on the ground in spaced relation to each other, a seed distributing device rotatably mounted between the container and conduits and adapted when rotated to distribute the seeds discharged from the container to the conduits in alternation, and means for rotating the seed plate and the distributing device in unison.

5. In a seed planter, the combination of a seed container having a plurality of discharge openings at relatively widely separated points in a circle, mechanism for separating individual seeds from the mass in the container comprising a rotatable seed plate having a circular series of seed cells which pass in succession over the discharge openings when the plate is rotated, a plurality of conduits associated with each discharge opening and adapted to receive seeds discharged from the container and deposit them on the ground in spaced relation to each other, a seed distributing device rotatably mounted between the container and the conduits on an axis substantially coincident with that of the seed plate and adapted when rotated to distribute the seeds discharged from each container opening to the conduits associated therewith in alternation, and means for rotating the seed plate and distributing device in unison.

6. In a seed planter, the combination of a container for seeds, mechanism for separating individual seeds from the mass in the container and discharging them therefrom, a plurality of downwardly extending conduits arranged to receive the seeds discharged from the container and deposit them on the ground along two parallel lines spaced from each other to form a double row, dropping valves at the lower ends of said conduits adapted to simultaneously discharge the seeds from the conduits to effect hill planting, means for locking said valves open to effect drilling of the seeds, and adjustable means controllable independently of the seed-separating mechanism and operable independently of the dropping valves to vary the spacing of the seeds of one line of the row longitudinally with respect to the seeds of the other line of the row when drilling.

7. In a seed planter, the combination of a container for seeds, mechanism for separating invididual seeds from the mass in the container and discharging them therefrom, a plurality of downwardly extending conduits arranged to receive the seeds discharged from the container and deposit them on the ground along two parallel lines spaced from each other to form a double row, dropping valves at the lower ends of said conduits adapted to simultaneously discharge the seeds from the conduits to effect hill planting, means for locking said valves open to effect drilling of the seeds, means for varying the spacing of the seeds in each line of the drilled row, and adjustable means controllable independently of the seed-separating mechanism and operable independently of the dropping valves to vary the spacing of the seeds of one line of the row longitudinally with respect to the seeds of the other line of the row when drilling.

8. In a seed planter, the combination of a container for seeds, mechanism for separating individual seeds from the mass in the container and discharging them therefrom, a plurality of downwardly extending conduits arranged to receive the seeds discharged from the container and deposit them on the ground along two parallel lines spaced from each other to form a double row, dropping valves at the lower ends of said conduits adapted to simultaneously discharge the seeds from the conduits to effect hill planting, means for locking said valves open to effect drilling of the seeds, and adjustable means mounted in one of the conduits and operable independently of the dropping valves to variably retard the passage of seeds through said conduit and thus vary the spacing of the seeds of the other line of the row when drilling.

9. In a seed planter, the combination of a seed container having a discharge opening, mechanism for separating individual seeds from the mass in the container and delivering them singly into the discharge opening, a plurality of conduits adapted to receive seeds discharged from the container and deposit them on the ground in spaced relation to each other, and means adapted either to be moved in synchronism with the seed-separating mechanism to distribute the discharged seeds from the container to the conduits in alternation or to be fixed in position to deliver the discharged seeds to one of said conduits.

10. In a seed planter, the combination of a seed container having a discharge opening, mechanism for separating individual seeds from the mass in the container comprising a rotatable seed plate having a circular series of seed cells which pass in succession over the discharge opening when the seed plate is rotated, a plurality of conduits adapted to receive seeds discharged from the container and deposit them on the ground in spaced relation to each other, a seed distributing device rotatably mounted between the container and the conduits and adapted when rotated to distribute the seeds discharged from the container to the conduits in alternation, disengageable driving connections for the distributing device adapted to rotate it in unison with the seed plate, and means for fixing the distributing device in register with the discharge opening and one of the conduits.

In testimony whereof I affix my signature, in the presence of two witnesses.

RAY S. GEHR.

Witnesses:
EDNA A. NIERATH,
JENNIE T. HAYLOR.